R. C. BAKER

April 14, 1931. CORE BARREL Re. 18,045

Original Filed Dec. 15, 1925

INVENTOR.
REUBEN C. BAKER
BY Lawey, Strong, Townsend & Lofftus
ATTORNEYS.

Reissued Apr. 14, 1931

Re. 18,045

UNITED STATES PATENT OFFICE

REUBEN C. BAKER, OF COALINGA, CALIFORNIA, ASSIGNOR TO BAKER CASING SHOE COMPANY, OF HUNTINGTON PARK, CALIFORNIA, A CORPORATION OF CALIFORNIA

CORE BARREL

Original No. 1,611,504, dated December 21, 1926, Serial No. 75,499, filed December 15, 1925. Application for reissue filed July 16, 1928. Serial No. 295,885.

This invention relates to oil well drilling equipment and particularly pertains to an apparatus for use in taking formation samples or cores of the formation penetrated by the drill.

Prior to my invention it was usual practice in drilling a well by the percussion method, to bring the cuttings to the surface by means of a bailer for examination to determine the characteristics of the formation penetrated by the drill. This system proved unsatisfactory principally for the reason that an inaccurate log of the well was obtained.

It is the principal object of the present invention to provide an improved device adapted for use in connection with the percussion system of well drilling and which may be efficiently employed to obtain accurate samples or cores of a well at frequent intervals.

In carrying out this object into practice I have provided a hollow drill barrel which may be run in the well at the end of the drill stem. A hollow core barrel is reciprocably mounted within the lower end of the drill barrel so that vertical reciprocation of the latter will drive the core barrel over the core so that a sample of the formation being penetrated may be brought to the surface for examination. I also make use of the relative reciprocation of the parts to force cleansing fluid around the cutting ends of the tool to clean away the drillings and cuttings so that a clean cut core will be obtained.

One form which the invention may assume is exemplified in the following description and illustrated by way of example in the accompanying drawings, in which.

Figure 1:
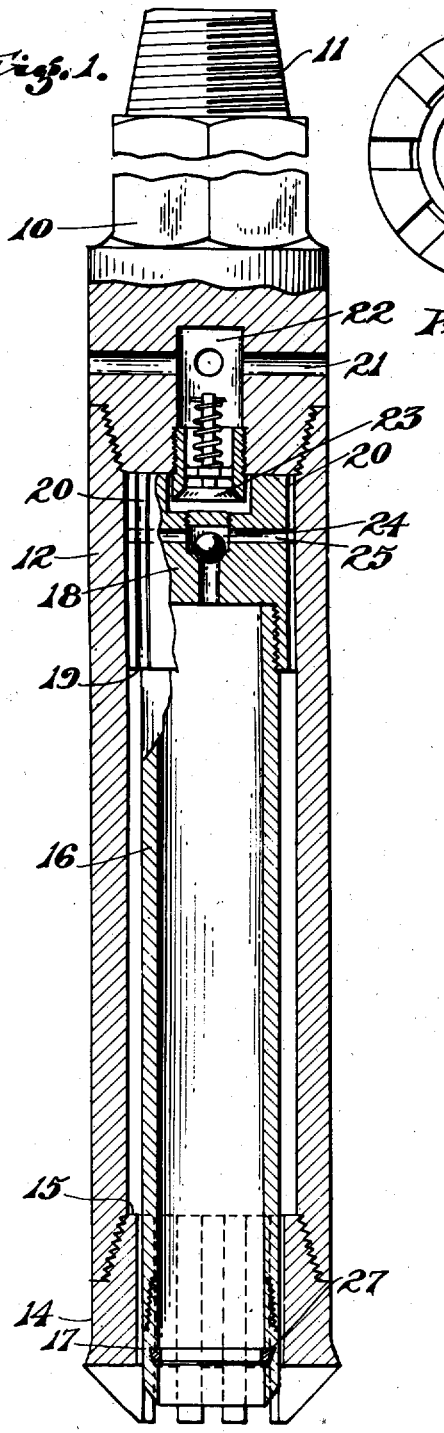
Fig. 1 is a view in vertical section through an apparatus embodying the preferred form of the invention.
Figure 3:
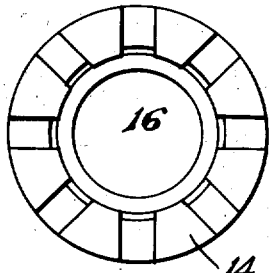
Fig. 3 is a view of the lower end of the device.
Figure 2:
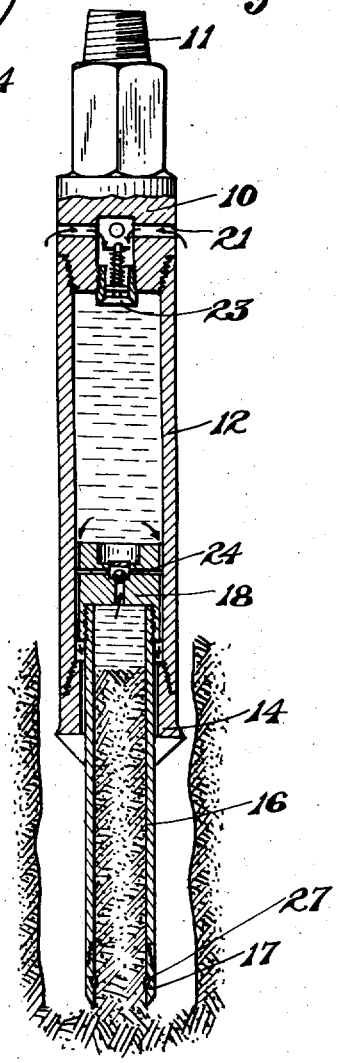
Fig. 2 is a similar view of the device disclosing the manner of its operation.

Referring more particularly to the accompanying drawings, 10 indicates a drill barrel head having a threaded shank 11 at its upper end by means of which the device may be connected with a drill stem. The lower end of the drill barrel head 10 is exteriorly threaded and is threadedly connected with the upper end of a cylindrical drill barrel 12. The lower end of this drill barrel 12 is fitted with a drilling shoe 14 which is capable upon vertical reciprocation of the device to drill through the strata encountered in drilling an oil well. The interior diameter of the shoe 14 is less than that of the barrel 12 so as to form an interiorly projecting annular shoulder 15 within the barrel 12 and adjacent its lower end.

Reciprocably mounted within the bore of the drill barrel 12 is a cylindrical core barrel 16 which is fitted at its lower end with a shoe 17 having a sharpened lower end. The exterior diameter of the core barrel 16 and its shoe 17 is somewhat less than the interior diameter of the drilling shoe 14 and similarly the drill barrel 12. This forms an annular passageway between the adjacent surfaces of the two barrels.

At it upper end the core barrel 16 is fitted with a head member 18 which is larger in diameter than the barrel 16 thereby forming an exteriorly projecting annular shoulder 19. This shoulder 19 is adapted to abut against shoulder 15 when the core barrel is in its lowermost position and thereby prevent removal of the core barrel from the drill barrel without removing the shoe 14 from the latter.

The exterior surface of the core barrel head member 18 is formed with a plurality of longitudinal grooves 20 to permit liquid lodged above the head 18 to pass downwardly through the passage between the barrels and discharge intermediate the cutting edges of the shoes.

It will be noticed from Fig. 1 that the lower end of the drill shoe 14 is formed with cutting teeth. Intermediate these cutting teeth the bore of the drill shoe is formed with a plurality of vertical passageways through which the fluid passing downwardly through the passage between the barrels may discharge between the cutting edges of the shoes.

It will also be noticed that the core barrel 16 is guided both by its head 18 and by reason of its mounting within the drill barrel shoe 14. This mounting of the core barrel will hold it in correct axial alignment relative to the drill barrel at all times.

One of the features of the present device is the delivery of fluid to the cutting edges of the shoes to clean away the cuttings. This is accomplished by providing radial passage ways 21 in the drill barrel head 10 which extend inwardly from the exterior surface of the head to an interior chamber 22 extending inwardly from the lower end of the head 10. The lower end of the chamber 22 is normally closed by a spring pressed back pressure valve 23, which opens downwardly. This valve is capable of admitting the fluid to the upper end of the bore of the drill barrel when the drill barrel is raised relative to the core barrel. When the former is lowered relative to the core barrel, the valve 23 prevents return of the fluid through the head 10 and the fluid is consequently forced downwardly through the passage between the barrels to a point intermediate the lower edges of the cutting shoes. This fluid washes away the cuttings.

In operation, if it is desired to take a core of a well, the device is connected to the drill stem as described and run in the well. During the running in, the core barrel will assume its lowermost position but will remain connected to the drill barrel due to the abutment of the shoulders 15 and 19. Upon reaching bottom, the drill shoe will commence cutting and the lower end of the head 10 will pound on the upper end of the core barrel head and force it over the core. As the drill shoe is operated by the percussion method, the drill barrel will be constantly reciprocated relative to the core barrel when in operation and at each stroke will simultaneously cut around the core and drive the core barrel over the core thus cut.

At each upward stroke of the drill barrel relative to the core barrel, water will pass through the radial passageways 21 and through the valve 23 and thence into the chamber between the head 10 and core barrel head 18. Upon the downward stroke of the drill barrel, the valve 23 will close and the water or fluid will be expelled downwardly through the grooves 20 in the head 18 into the passageway between the barrels, and thence through the vertical grooves in the bore of the drill shoe to a point intermediate the cutting edges of the shoes. This keeps the hole clean and permits a clean cut sample of the formation encountered to be obtained.

Any liquid trapped in the core barrel may discharge through a check valve 24 and radial passageways 25 which lead to the space intermediate the barrels.

As soon as a depth has been penetrated corresponding to the length of core desired, the entire device is removed from the well and the core is extracted by unscrewing the core barrel shoe from the barrel. If necessary, the entire core barrel may be removed from the drill barrel.

To hold the core in place, a loose split ring 27 is mounted interiorly of the core barrel shoe at its lower end. This ring pinches or shaves off the cores and at the same time prevents their removal from the barrel.

From the foregoing it is manifest that I have provided a device capable of use in connection with the percussion system of drilling and which may be efficiently employed to take cores or samples of the formation encountered at frequent intervals and at a minimum of time and expense.

While I have shown the preferred form of my invention, it is to be understood that various changes in its construction may be made by those skilled in the art without departing from the spirit of the invention as defined in the appended claims.

I claim:

1. A device of the character described comprising a drill barrel having a closed upper end, means at the upper end of the barrel by which it may be connected with a tool for lowering it and operating it within a well, a core barrel mounted within the drill barrel and free for a limited amount of axial movement relative thereto, a drilling shoe at the lower end of the drill barrel whereby vertical reciprocation of the drill barrel at the bottom of a well will form a core, the upper end of the drill barrel being adapted to strike against the upper end of the core barrel during the reciprocation of the drill barrel and thereby drive the core barrel over the core formed by the drill barrel, fluid delivery means formed intermediate the barrels, and means for delivering fluid through said delivery means and discharge it intermediate the lower ends of the barrels.

2. A device of the character described comprising a drill barrel having a closed upper end, means at the upper end of the barrel by which it may be connected with a tool for lowering it and operating it within a well, a core barrel mounted within the drill barrel and free for a limited amount of axial movement relative thereto, a drilling shoe at the lower end of the drill barrel whereby vertical reciprocation of the drill barrel at the bottom of a well will form a core, the upper end of the drill barrel being adapted to strike against the upper end of the core barrel during the reciprocation of the drill barrel and thereby drive the core barrel over the core formed by the drill barrel, fluid delivery means formed intermediate the barrels, and means actuated by the relative reciprocation of the barrels to force fluid through said delivery means and discharge it intermediate the lower ends of the barrels.

3. A device of the character described comprising a drill barrel having a closed upper end, means at the upper end of the barrel by which it may be connected with a tool for lowering it and operating it wthin a well, a core barrel mounted within the drill barrel and free for a limited amount of axial movement relative thereto, a drilling shoe at the lower end of the drill barrel whereby vertical reciprocation of the drill barrel at the bottom of a well will form a core, the upper end of the drill barrel being adapted to strike against the upper end of the core barrel during the reciprocation of the drill barrel and thereby drive the core barrel over the core formed by the drill barrel, a fluid passageway intermediate the barrels, a check valve for admitting fluid intermediate the upper ends of the barrels upon the upward stroke of the drill barrel, said check valve closing upon the downward stroke of the drill barrel causing said fluid to be expelled through said passageway and discharged intermediate the lower ends of said barrels.

4. A device of the character described comprising a drill barrel having a closed upper end, means at the upper end of the barrel by which it may be connected with a tool for lowering it and operating it within a well, a core barrel mounted within the drill barrel and free for a limited amount of axial movement relative thereto, a drilling shoe at the lower end of the drill barrel whereby vertical reciprocation of the drill barrel at the bottom of a well will form a core, the upper end of the drill barrel being adapted to strike against the upper end of the core barrel during the reciprocation of the drill barrel and thereby drive the core barrel over the core formed by the drill barrel, a fluid passageway intermediate the barrels, a check valve for admitting fluid intermediate the upper ends of the barrels upon the upward stroke of the drill barrel, said check valve closing upon the downward stroke of the drill barrel causing said fluid to be expelled through said passageway and discharged intermediate the lower ends of said barrels, discharge ports formed in the upper end of the core barrel, a check valve controlling said ports whereby fluid trapped in the core barrel may be discharged into said passageway intermediate the barrels.

5. A core drill including a core barrel having a closed upper end, means at the upper end of the barrel by which it may be connected with a tool for lowering it and operating it within a well, a core barrel mounted within the drill barrel and free for a limited amount of axial movement relative thereto, a drilling shoe at the lower end of the drill barrel whereby vertical reciprocation of the drill barrel at the bottom of the well will form a core, fluid delivery means formed intermediate the barrels, and means for delivering fluid through said delivery means and discharging it intermediate the lower end of the barrels.

6. In a percussion type core drill, the combination of inner and outer core barrels, means for delivering fluid through delivery means formed intermediate the barrels and discharging the same intermediate the lower ends of the barrels, core-cutting means formed at the lower end of one of said barrels, and percussion means for driving the core-cutting means into the formation to form a core of the formation.

7. In a percussion type core drill, the combination of a pair of concentrically disposed members, core cutting means, percussion means for driving the core-cutting means into the formation to form a core of the formation, means including longitudinally extensible and concentrically disposed members for drawing fluid from the drilled hole and for longitudinally collapsing said concentric members to direct said fluid toward the core-cutting means.

8. A sample-taking device including concentrically disposed members, a core receiving barrel secured to one of said members, core-cutting means secured to one of said members, means for effecting relative longitudinal movement of said concentrically disposed members and for driving said core barrel to take a core, valve means carried by said concentrically disposed members for creating a suction within the same when the members are moved longitudinally in one direction for drawing a fluid from the hole drilled and for forcing the fluid downwardly toward the core-taking members as the concentrically disposed members are moved longitudinally relative to each other in the opposed direction.

9. In a percussion type core drill, the combination of a core-receiving barrel, a second barrel mounted around the core-receiving barrel, the two said barrels being longitudinally expansible, means for driving the inner barrel into the formation so that a core is received in the inner barrel, and for relatively reciprocating the said barrels to draw a liquid from the drilled hole into the outer of said barrels and to force the same from the outer of said barrels on the opposite strokes of the relative reciprocation of said barrels.

Signed at Los Angeles, California, this 27 day of June, 1928.

REUBEN C. BAKER.